(12) United States Patent
Okada et al.

(10) Patent No.: US 10,222,300 B2
(45) Date of Patent: Mar. 5, 2019

(54) METHOD OF CORRECTING UNIFORMITY WAVEFORM OF TIRE

(71) Applicant: Kobe Steel, Ltd., Hyogo (JP)

(72) Inventors: Toru Okada, Kobe (JP); Shogo Sarumaru, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 377 days.

(21) Appl. No.: 14/434,941

(22) PCT Filed: Nov. 8, 2013

(86) PCT No.: PCT/JP2013/080310
§ 371 (c)(1),
(2) Date: Apr. 10, 2015

(87) PCT Pub. No.: WO2014/073662
PCT Pub. Date: May 15, 2014

(65) Prior Publication Data
US 2015/0260613 A1    Sep. 17, 2015

(30) Foreign Application Priority Data
Nov. 12, 2012 (JP) .................................. 2012-248378

(51) Int. Cl.
*G01M 17/02*    (2006.01)
(52) U.S. Cl.
CPC ........ *G01M 17/022* (2013.01); *G01M 17/024* (2013.01)
(58) Field of Classification Search
None
See application file for complete search history.

(56) References Cited

U.S. PATENT DOCUMENTS

| 4,171,641 A | 10/1979 | Landsness |
| 4,404,848 A | 9/1983 | Iwama et al. |
| | (Continued) | |

FOREIGN PATENT DOCUMENTS

| JP | S57-141532 A | 9/1982 |
| JP | H02-259445 A | 10/1990 |
| | (Continued) | |

OTHER PUBLICATIONS

International Search Report; PCT/JP2013/080310; dated Dec. 17, 2013.

(Continued)

*Primary Examiner* — Roy Y Yi
(74) *Attorney, Agent, or Firm* — Studebaker & Brackett PC

(57) ABSTRACT

A uniformity waveform for a tire (T) and a rotational phase of a load drum (4) are measured with a load drum (4) pressed against the tire (T). In a waveform of the frequency domain acquired by frequency conversion of the uniformity waveform, the amplitude and phase for a component of an integer multiple of the rotational frequency of the load drum (4) are found and stored as a correction parameter. A corrected tire (T) uniformity waveform is calculated by subtracting from the uniformity waveform a correction waveform calculated on the basis of the correction parameter, the correction waveform being the one in the rotational phase range of the load drum (4) during tire measurement.

2 Claims, 3 Drawing Sheets

(56) References Cited

U.S. PATENT DOCUMENTS

| | | | | |
|---|---|---|---|---|
| 5,614,676 A | * | 3/1997 | Dutt | G01M 17/022 |
| | | | | 702/56 |
| 6,035,709 A | * | 3/2000 | Barnette, Jr. | G01M 17/024 |
| | | | | 73/146 |
| 6,065,331 A | | 5/2000 | Fukasawa | |
| 9,120,280 B2 | * | 9/2015 | Mawby | B29D 30/0633 |
| 2005/0201234 A1 | * | 9/2005 | Hanks | G11B 19/28 |
| | | | | 369/47.38 |
| 2011/0113875 A1 | | 5/2011 | Okada et al. | |
| 2013/0205883 A1 | * | 8/2013 | Symens | G01M 17/022 |
| | | | | 73/146 |

FOREIGN PATENT DOCUMENTS

| | | |
|---|---|---|
| JP | H05-229320 A | 9/1993 |
| JP | 06-229866 | 8/1994 |
| JP | H11-142295 A | 5/1999 |
| JP | 2004-217185 A | 8/2004 |
| JP | 2006-105775 A | 4/2006 |
| JP | 2006-105776 | 4/2006 |
| JP | 2008-058082 A | 3/2008 |
| JP | 2008-089467 A | 4/2008 |
| JP | 2010-204018 A | 9/2010 |
| WO | 2010/010798 A1 | 1/2010 |

OTHER PUBLICATIONS

Written Opinion of the International Searching Authority; PCT/JP2013/080310; dated Dec. 17, 2013.

* cited by examiner

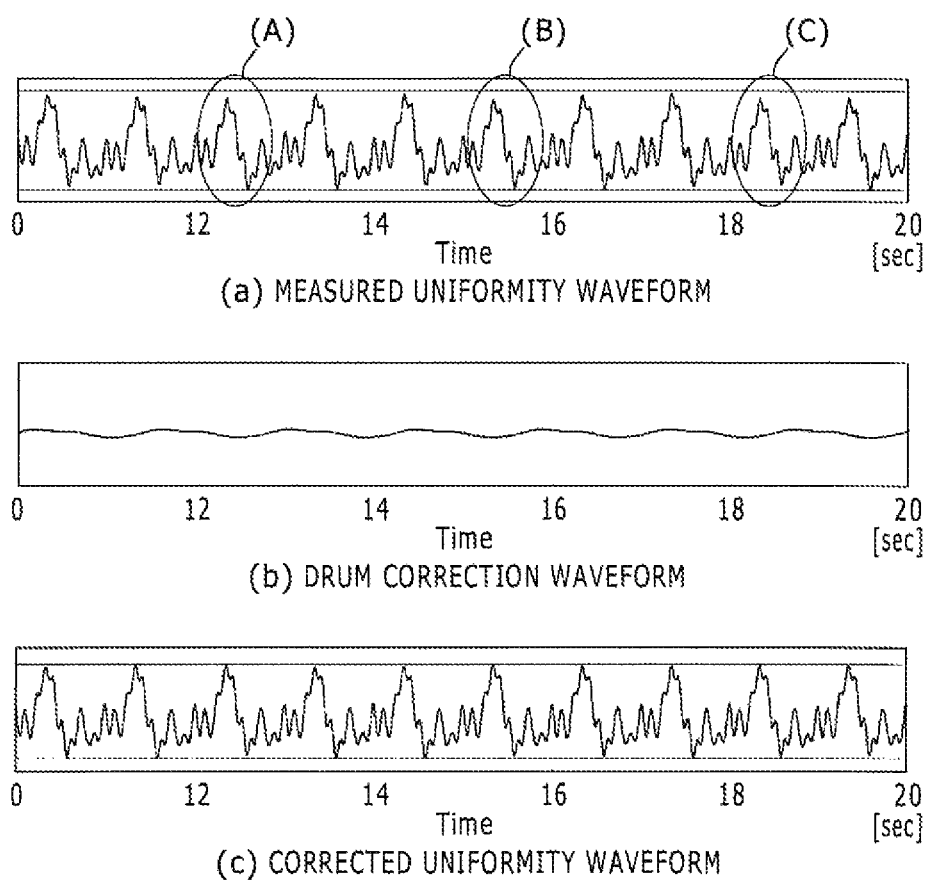

METHOD OF CORRECTING UNIFORMITY WAVEFORM OF TIRE

TECHNICAL FIELD

The present invention relates to a technique for correcting a uniformity waveform obtained using a tire uniformity machine.

BACKGROUND ART

A tire test (tire uniformity test) is conventionally conducted in which the state or quality such as uniformity (consistency) of a tire, as a finished product, is measured to determine whether the tire is bad or good. In the tire test, the tire is pressed against the outer circumferential surface of a load drum that is mounted on a tire uniformity machine. In this situation, a load applied in radial and lateral directions of the tire, when the tire is caused to rotate, is measured as a uniformity waveform using a device such as a load cell mounted to the load drum, and tire uniformity is assessed, based on the measured uniformity waveform.

Parenthetically, a load drum mounted to the tire uniformity machine is machined into, for example, a cylindrical shape whose cross-section is a true circle; however, the cross-section is not strictly made to be a perfect true circle because of limitations of machining accuracy or the like. In other words, some unevenness is inevitably created on the outer circumferential surface of the load drum. In this way, when a tire is caused to rotate with the tire in contact with the outer circumferential surface of the load drum which is not the perfect true circle, rotation vibrations are created at a rotation shaft of the load drum when the tire passes on the slight unevenness that exists on the outer circumferential surface of the load drum. The created rotation vibrations are contained as an error in a uniformity waveform measured with a load cell. As a result, the accuracy of the tire uniformity calculated based on a uniformity waveform containing such an error is likely to degrade.

Consequently, in order to remove an error resulting from the rotation vibrations of such a load drum from the uniformity waveform measured with a device such as a load cell, in other words, to correct the measured uniformity waveform, some methods of correction have already been conceived (Patent Document 1, Patent Document 2, etc.).

In the method of correction in, for example, Patent Document 1, a detector (sensor) is provided which is capable of detecting a displacement of the outer circumferential surface of the load drum (displacement in the radial direction of the tire, or alternatively that in the lateral direction thereof). And the displacement of the load drum detected with the detector is measured as rotation vibrations. Then, what is obtained by multiplying the measured load drum's rotation vibrations by a tire's spring constant is computed as a waveform of force variation exerted by rotation vibrations on the load drum. The uniformity waveform can be corrected by subtracting the thus computed waveform of force variation, as a correction waveform for correcting an error resulting from the rotation vibrations, from the actually measured uniformity waveform.

Further, in the method of correction in Patent Document 2, a uniformity waveform measured with a load cell is divided into a data segment per revolution of a tire, and the divided uniformity waveforms are overlaid together. In this way, if uniformity waveforms are overlaid together for each data segment per revolution of the tire, then the error can be canceled by overlaying, and an average uniformity waveform can be obtained. Subtracting such an average uniformity waveform from the uniformity waveform actually measured with the load cell, yields a waveform that contains an error component resulting from the rotation vibrations of the load drum. The yielded waveform containing the error component is next divided into the data segment per revolution of the load drum, and when the divided waveform segments are overlaid together, the waveforms containing the error components are averaged. As with Patent Document 1, this enables finding a correction waveform for correcting the error resulting from the rotation vibrations.

CITATION LIST

Patent Document

Patent Document 1: JP 1982-141532 A
Patent Document 2: JP 1990-259445 A

SUMMARY OF THE INVENTION

Problems that the Invention is to Solve

Parenthetically, the method of correction in Patent Document 1 is in some cases difficult to accurately compute the above described correction waveform, depending on types of tires (type and size).

In, for example, an actual tire uniformity machine, the position where a tire is pressed against a load drum is in many cases determined according to the tire of standard type and size. However, tires to be measured with the tire uniformity machine include wider and narrower tires rather than the standard ones. When such tires are tested, the height-wise level of a detector for detecting displacement of an outer circumferential surface of the tire is deviated from the optimal level. In other words, in the method of correction in Patent Document 1, the placement position of the detector is deviated from the optimal one depending on the type of a tire for which tire uniformity is to be measured, and the positional deviation of the detector results in a correction waveform to be computed being deviated from the proper one. For this reason, there is a possibility of an accurate correction waveform being difficult to obtain.

Further, in the method of correction in Patent Document 2, when a plurality of waveform segments are overlaid together to make average of them and if there is an error such as a slight deviation in phase, then such an error is also added, by overlaying, to a correction waveform. As a result, their overlaying action rather increases the degree of an error, and as with the method of correction in Patent Document 1, the accurate correction waveform is in some cases difficult to obtain.

The present invention is made in light of the above described problems, and its object is to provide a method of correcting a uniformity waveform of a tire that is capable of removing the influence resulting from rotation vibrations of a load drum from a measured uniformity waveform, and of enhancing accuracy of measurement of tire uniformity.

Means for Solving the Problems

In order to achieve the forgoing object, the following technical measures are taken in the method of correcting a uniformity waveform of a tire according to the present invention.

In other words, the present invention is a method of correcting a uniformity waveform of a tire, at the time when uniformity of the tire is measured while the tire is caused to rotate with a load drum pressed against the tire different in diameter from the load drum, the method comprises the steps of measuring the uniformity of the tire and a rotational phase of the load drum, using a load cell and a rotational phase meter provided to the load drum; frequency-converting a measured uniformity waveform into a waveform in a frequency domain; finding an amplitude and a phase in a component of an integral multiple of a rotational frequency of the load drum, in a waveform in the converted frequency domain; storing as a correction parameter the found amplitude and phase in the component of the integral multiple of the rotational frequency of the load drum; measuring the uniformity waveform of the tire and calculating a correction waveform in a range of a rotational phase of the load drum at the time when the tire is measured based on the stored correction parameter; and computing the corrected uniformity waveform of the tire by subtracting the calculated correction waveform from the measured uniformity waveform.

Preferably, the method further includes the steps of finding in advance a correction parameter for each type of the tire; calculating the correction waveform for each type of the tire, based on the correction parameter found in advance; and computing a corrected uniformity waveform of the tire by subtracting the calculated correction waveform from th measured uniformity waveform.

Advantageous Effects

According to a method of correcting a uniformity waveform of a tire of the present invention, an influence resulting from rotation vibrations of a load drum can be removed from a measured uniformity waveform, thus enhancing accuracy of measurement of tire uniformity.

BRIEF DESCRIPTION OF DRAWINGS

FIG. 4 (a) is a diagram showing the measured uniformity waveform, FIG. 4 (b) is a diagram showing a correction waveform, and FIG. 4 (c) is a diagram showing a corrected uniformity waveform.

DESCRIPTION OF EMBODIMENT

First Embodiment

A tire uniformity machine 1 on which a method of correcting a uniformity waveform of a tire T according to the present invention is implemented will be first described with reference to the drawings.

Figure 1:
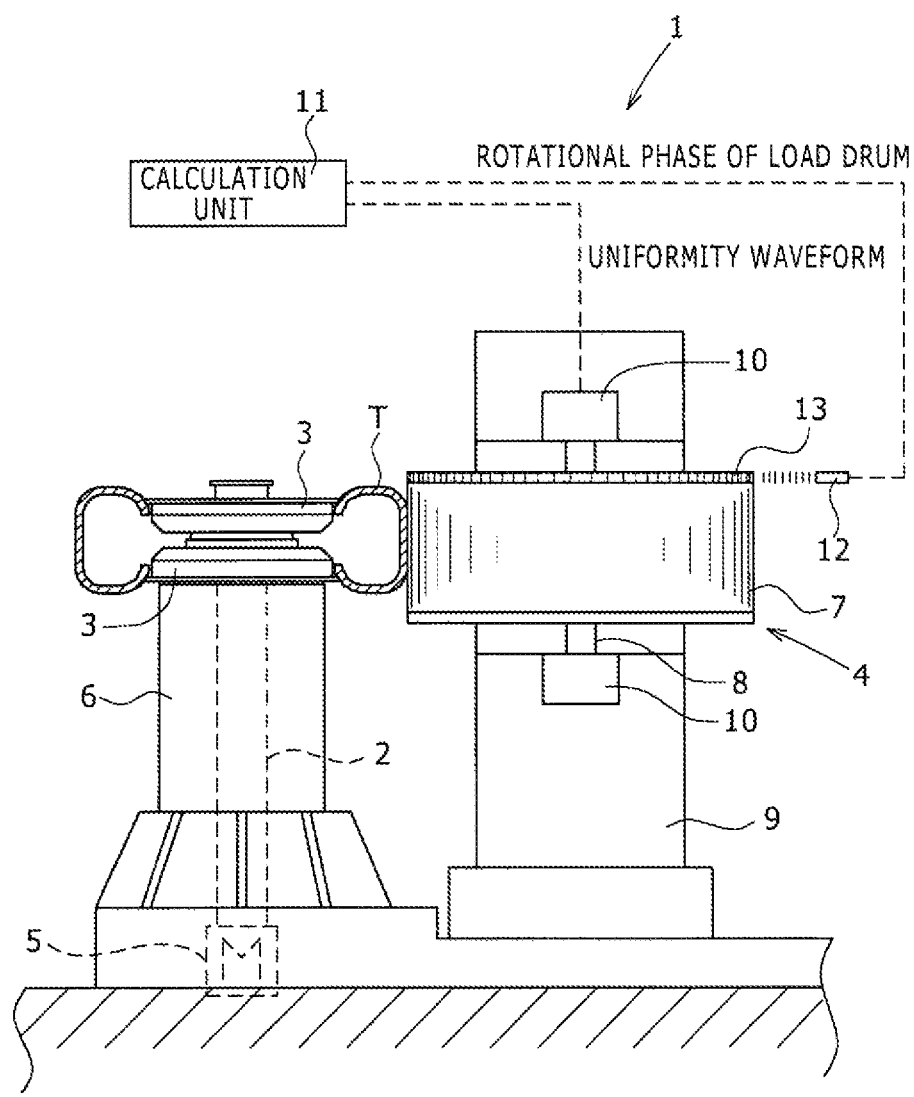
FIG. 1 is a schematic diagram of a tire uniformity machine according to the present invention.

As shown in FIG. 1, in the tire uniformity machine 1 (tire uniformity testing device), a product inspection of the as-finished tire T is conducted by assessing a characteristic such as tire uniformity. The tire uniformity machine 1 is configured to assess as a product inspection a variation of force in a radial direction of the tire (radial force variation: RFV) and a variation of force in a lateral direction of the tire (lateral force variation: LFV), each being created when the tire T is caused to rotate.

Specifically, the tire uniformity machine 1 has a spindle shaft 2 disposed rotatably about an axis directing upwardly and downwardly. A pair of upper and lower rims 3 that fixedly attach the tire T are provided on the upper end portion of the spindle shaft 2. The spindle shaft 2 is configured or designed to support the tire T, fixedly attached to the rims 3 thereto, rotatably about the axis directing upwardly and downwardly. In addition, disposed on a lateral side of the spindle shaft 2 is a load drum 4 that is substantially cylinder-shaped and has a simulated road surface formed on its outer circumferential surface. The load drum 4 is movable in the horizontal direction, as well as being rotary drivable about the axis directing upwardly and downwardly. The outer circumferential surface of the load drum 4 can be placed in contact with or spaced away from the tire T mounted to the spindle shaft 2.

Note that, in the explanation of the present description, the upward and the downward directions of FIG. 1 are assumed to be the upward and the downward directions that are referred to when describing the tire uniformity machine 1. Note again that the right-hand and the left-hand in FIG. 1 are assumed to be the front and the back that are referred to when describing the tire uniformity machine 1, and further that the direction perpendicular to the drawing sheet of FIG. 1 is assumed to be the leftward and rightward direction that is referred to when describing the tire uniformity machine 1.

The spindle shaft 2 and the load drum 4 each constituting the tire uniformity machine 1 will next be described in detail.

The spindle shaft 2 is a long rod shaped member disposed in the upward and downward direction; provided on its upper end portion are the rims 3 that fixedly attach the inner circumferential portion of the tire T thereto by placing the circumferential portion between the upper and lower rims. An electric motor 5 that causes the spindle shaft 2 to rotate is disposed in the lower end portion of the spindle shaft 2, and it is configured or designed that the motor 5 allows the tire T fixedly attached to the rims 3 to rotate positively or reversely. Further, the spindle shaft 2 is disposed with it inserted within a spindle housing 6 from above.

The load drum 4 includes a drum body 7 disposed in such a way that its axis is oriented in the upward and downward direction, as well as being formed in a short and cylindrical shape; a rotation shaft 8 that supports the drum body 7 rotatably about the axis oriented in the upward and downward direction; and a frame 9 that supports the rotation shaft 8 rotatably. In addition, a load cell 10 that measures a load acting on the load drum 4 is provided at the upper and lower ends of the rotation shaft 8, so that the above described drum body 7 and rotation shaft 8 are supported via the load cell 10 by the frame 9. Further, the load drum 4, which is horizontally movable in the backward and forward direction, is configured or designed to allow the outer circumferential surface of the drum body 7 to press against the tire T at a predetermined load.

The load thus measured with the load cell 10 is transferred to a calculation unit 11.

Disposed on the side of the above described load drum 4 is a rotational phase meter 12 that measures a rotational phase (frequency and phase) of the load drum 4. The rotational phase meter 12 is configured such that the rotational phase of the load drum 4 is measured by reading position marks 13 provided on the drum body 7. In other words, the drum body 7 has the position marks 13 circumferentially formed in advance on its outer circumferential surface (in the exemplary illustration, on the upper end of the outer circumferential surface). And the rotational phase meter 12 is disposed at a location laterally spaced apart from the position marks 13. By reading out the position marks 13 provided on the outer circumferential surface of the drum body 7, the rotational phase meter 12 is enabled to measure the rotational phase of the drum body 7. As with the above described load measured using the load cell, the rotational phase of the load drum 4 measured with this rotational phase meter 12 is transferred to the calculation unit 11.

The calculation unit 11 computes a correction parameter required to compute a correction waveform, based on the load measured with the load cell 10 and the rotational phase of the load drum 4 measured with the rotational phase meter 12. The correction waveform is a waveform for removing the influence of the load drum 4 from the measured uniformity waveform, and is a waveform that is used when the correction is made. In addition, the calculation unit 11, having the computed correction parameter stored therein, computes the correction waveform based on the stored correction parameter when the uniformity of the tire T is actually measured, and the unit corrects the uniformity waveform using the computed correction waveform.

Specifically, used as the calculation unit 11 is a computer such as a professional or personal use, and signals are processed in the following orders.

A procedure for processing a signal in the calculation unit 11, in other words, a method of correcting a uniformity waveform according to the present invention, will be described hereinafter.

In the method of correcting the uniformity waveform according to the present invention, a rotational phase of the load drum 4, as well as a uniformity waveform of the tire T, is measured using the load cell 10 and the rotational phase meter 12. The measured uniformity waveform is frequency-converted into a waveform in a frequency domain. In terms of the converted waveform in the frequency domain, amplitude and phase can be found in a component of an integral multiple of a rotational frequency of the load drum 4. The found amplitude and phase in the component of the integral multiple of rotational frequency of the load drum 4 is stored as a correction parameter. Then, the correction waveform in the rotational phase range of the load drum 4 during tire uniformity measurement is calculated based on the stored correction parameter, as well as the uniformity waveform of the tire T being measured, and the calculated correction waveform is subtracted from the measured uniformity waveform, whereby the corrected uniformity waveform of the tire T is computed.

In other words, when computing the above described correction parameter, the tire T for which a correction parameter is to be found needs to be fitted to the tire uniformity machine 1 and then its uniformity waveform and a rotational phase of the load drum 4 needs to be measured in advance.

By placing the tire T between the upper and lower rims 3, the tire T is mounted at the upper portion of the spindle shaft 2. And the load drum 4 is horizontally moved toward the spindle shaft 2, and the outer circumferential surface of the load drum 4 (drum body 7) is pressed against the tire T at a predetermined pressing load.

Next, the spindle shaft 2 is caused to rotate by the motor 5. Just then, the tire T, fixedly attached at the upper end portion of the spindle shaft 2, also rotates at a predetermined rotational frequency, and the load drum 4 in contact with the tire T rotates in agreement with the rotation of the tire T. And the load cell 10 provided on the load drum 4 measures loads that are applied in radial and lateral directions of the tire.

Note that when a load is measured using the load cell 10, the load drum 4 rotates at the rotational frequency different from that of the tire T because the tire T is generally formed to be different in diameter from the load drum 4. Thus, the load cell 10 attached to the rotation shaft 8 of the load drum 4 measures a uniformity waveform which is obtained by overlaying together a component that varies according to the rotational phase of the tire T and a component that varies according to the rotational phase of the load drum 4 having rotation vibrations.

Note that load variation in a radial direction of the above described tire T is called Radial Force Variation (RFV), and that in a lateral direction thereof is called Lateral Force Variation (LFV). In the description provided herein below, the method of correcting the uniformity waveform according to present embodiment will be described by exemplifying a method of computing a correction waveform from an RFV value, and an LFV value can also be corrected by the same method.

Figure 2:
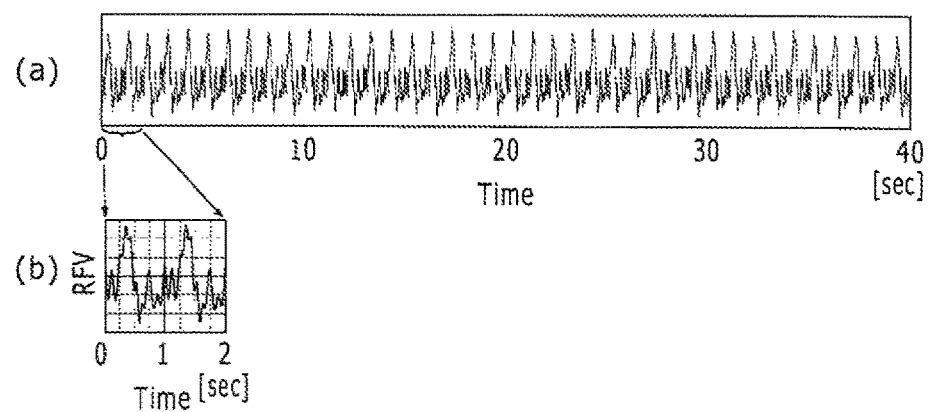
FIG. 2 (a) is a diagram showing a uniformity waveform measured with the tire uniformity machine, and FIG. 2 (b) is a partially enlarged view of FIG. 2 (a).

Of the loads measured with the load cell 10, FIG. 2 (a) shows a uniformity waveform of the RFV. In addition, FIG. 2 (b) shows an enlarged waveform of a zero to 2 second segment in the unity waveform illustrated in FIG. 2 (a). If the rotational frequency of the tire T is, for example, 60, the uniformity waveform of the RFV is measured as a waveform such that the same waveform is continuously repeated in a data cycle of one second, as shown enlarged in FIG. 2 (b).

Figure 3:
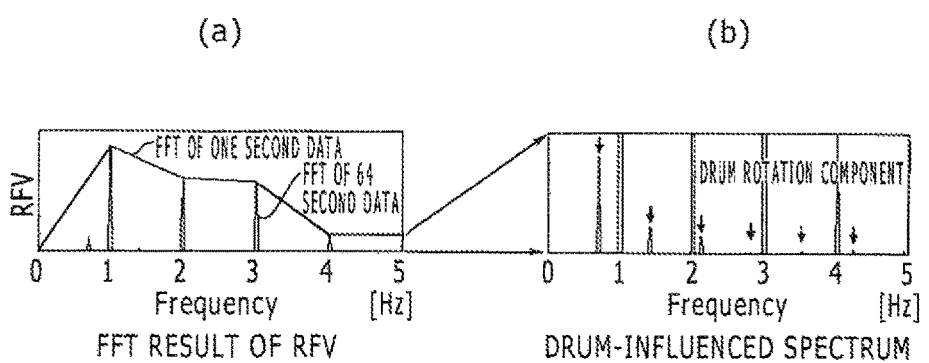
FIG. 3 (a) is a result obtained by performing a fast Fourier transform (FFT) of the measured uniformity waveform, and FIG. 3 (b) is an enlarged diagram of the result obtained by the FFT.

In this way, when the rotational frequency of the tire T is 60 (rotation frequency 1 Hz), performing a fast Fourier transform (FFT) calculation of the measured uniformity waveform yields a peak at a frequency (e.g., 1 Hz, 2 Hz, 3 Hz . . . etc.) of the multiples of 1 Hz, as shown in FIG. 3 (a) and FIG. 3 (b). The component of the multiples of 1 Hz varies according to the rotational phase of the tire T, as described above, and should primarily be used for assessment as uniformity of the tire T.

On the other hand, when the measurement time is in the order of one second and as short as that of the normal uniformity measurement, only a coarse variation curve in which a variation of the load is roughly grasped is obtained, as shown by a zigzag line in FIG. 3 (a), because of low resolution. However, when the time for measuring the tire uniformity is long, i.e., a few dozens of seconds or more, a precise variation curve in which an accurate load variation is grasped is obtained because of higher resolution. For example, when the time for measuring the tire uniformity is elongated to 64 seconds as shown in FIG. 3 (a), the resolution becomes higher and the presence of a sharply rising peak at a frequency that is the multiples of 1 Hz can be recognized ("spike-shaped waveforms" in FIG. 3 (a)).

In addition, in a graph in FIG. 3 (a), another short peak is also observed between sharply rising peaks that vary according to the rotational phase of the tire T. These peaks are components that vary according to the rotational phase of the load drum 4, as described above, among the loads to be measured with the load cell 10.

The component that varies according to the rotational phase of the load drum 4 is not as high in peak height as that which varies according to the rotational phase of the tire T. Accordingly, enlarging the vertical axis as shown in FIG. 3 (b) enables more accurately recognizing a frequency at which the peak occurs. In other words, the peak of the component that varies according to the rotational phase of the load drum 4 is observed for each frequency that is the multiples of 0.7 Hz different from 1 Hz, which observation shows that a peak of a component that varies according to a rotational phase of the tire T and a peak of a component that varies according to a rotational phase of the drum load 4 can clearly be separated from each other in a frequency space.

And thus, in the method of correction according to the present invention, the peak of the component that varies according to the rotational phase of the load drum 4 and the peak of the component that varies according to the rotational phase of the tire T are separated from each other in the frequency space, so that only the former peak is derived.

Specifically, in the method of correction according to the present invention, an amplitude Ai of the peak of the component that varies according to the rotational phase of the load drum 4 is first computed as a correction parameter. In addition, a rotational phase φi where each peak is observed that varies according to the rotational phase of the load drum 4 is measured using the above described rotational phase meter 12. The thus computed amplitude Ai and rotational phase φi are pre-stored as the correction parameter in the calculation unit 11. The foregoing is the procedure of computing the correction parameter.

Based on the thus computed correction parameter, a correction waveform is next computed, and the procedures of processing a signal when correcting the uniformity waveform will be described using the computed correction waveform. The signal processing is also performed by the calculation unit 11 provided to the tire uniformity machine 1.

First, in the above described procedure, a correction parameter is assumed to be found in advance in terms of the tire T for which uniformity is to be measured. In such a situation, the measurement of uniformity of the tire T is made by following the same procedure as used when computing a correction parameter for the first time. In other words, with the tire T attached to the spindle shaft 2, and with the outer circumferential surface of the load drum 4 pressed against the tire T at a predetermined pressing load, the spindle shaft 2 is caused to rotate using the motor 5. And a uniformity waveform is measured with the load cell 10 attached to the rotation shaft 8 of the load drum 4. Note that the uniformity waveform of the tire T measured at this time is in accordance with usual uniformity measurement conditions, and the measurement is made over a measurement time of about one second, which is shorter than the time used when finding the correction parameter.

Next, the rotational phase meter 12 measures a rotational phase θs at the time when a uniformity measurement is initiated, and a rotational phase θe at the time when the measurement time in the order of, e.g., one second elapses and the uniformity measurement terminates, and these data are stored in the calculation unit 11.

And by substituting the amplitude Ai and rotational phase φi stored in the calculation unit 11 into Equation (1) and performing a reverse Fourier transform using the following Equation (1), a correction waveform can be computed for the uniformity waveform measured in a phase range of the above described rotational phases θs to θe.

Equation 1

$$\text{Correction waveform} = A_1 \cos(\theta+\varphi_1) + A_2 \cos(2\theta+\varphi_2) + A_3 \cos(3\theta+\varphi_3) + \ldots \quad (1)$$

Note that A1, A2, A3 . . . and φ1, φ2, φ3 . . . in Equation (1) are numeric values called up as correction parameters from those stored in the calculation unit 11.

Note again that θ in Equation (1) represents phase increments computed by the following Equation (2), and is a phase angle that is calculated according to a sampling of uniformity waveform in the range of rotational phases θs to θe.

Equation 2

$$\Delta\theta = (\theta_e - \theta_s)/N_0 \quad (2)$$

where $\theta = i\,\Delta\theta$ (i=1, 2, 3 . . . $N_0$), and $N_0$ denotes the number of samplings per second for a uniformity waveform.

The thus computed correction waveform is configured of a component, separated in the frequency space, that varies according to the rotational phase of the load drum 4, and indicates an error stemming from a rotation of the load drum 4 and being added to the uniformity waveform, in other words, an influence resulting from rotation vibrations of the load drum 4.

Therefore, subtracting the correction waveform obtained through Equation (1) and Equation (2) from the actually measured uniformity waveform enables obtaining a corrected uniformity waveform.

For example, FIG. 4 (*a*) shows a result obtained by finding a uniformity waveform for the tire T that rotates at a rotational frequency of 60. When viewing the graph of FIG. 4 (*a*), it is revealed that peaks observed at circled portions (A) to (C) in the figure are shorter in peak height than other remaining peaks, and the component that varies according to the rotational phase of the load drum 4 is acting as an error on such peaks.

And thus, the drum correction waveform can be found by substituting the correction parameter pre-stored in the calculation unit 11 into Equation (1), as described above. The found correction waveform is low in peak height, as shown in FIG. 4 (*b*); it is longer in peak occurrence cycle than in FIG. 4 (*a*); and it varies according to the rotational phase of the load drum 4.

By next subtracting the correction waveform shown in FIG. 4 (*b*) from the uniformity waveform shown in FIG. 4 (*a*), the corrected uniformity waveform can be obtained as shown in FIG. 4 (*c*). In the correction uniformity waveform shown in FIG. 4 (*c*), peaks identified in the neighborhoods where 12, 15 and 18 seconds elapse and which correspond to places (A) to (C) in FIG. 4 (*a*) are substantially as high as those identified in the other remaining places.

This fact shows that a component that has been added as an error to the uncorrected uniformity waveform and that varies according to the rotational phase of the load drum 4 has been eliminated from the corrected uniformity waveform, and the measured uniformity waveform has positively been corrected.

As described above, if the measured uniformity waveform is converted into a waveform in the frequency domain, and only peaks stemming from the rotation of the load drum 4 in the frequency space are separated from those stemming from the rotation of the tire T, then only the former peaks can accurately be derived by eliminating the influence of external disturbances.

Preferably, load and rotational phase data may be collected over a long time for each type of the tire T, and their collected data may be retained as correction parameters. Doing so allows correction parameters to be provided in advance for a variety of types of the tire T, thus enabling calculating a correction waveform in a short time period, correcting a uniformity waveform, and accurately assessing uniformity of the tire T.

It should be noted that, in the embodiment disclosed herein, data, not explicitly disclosed, such as, for example, operating and production conditions, various parameters, dimensions, weights and volumes of the constituent elements, does not depart from the scope to be normally embodied by those skilled in the art, and values are employed that an ordinary person skilled in the art would be able to readily envision.

It should be understood that the embodiment disclosed herein is illustrative and not restrictive in all aspects. The scope of the present invention is defined by the claims rather than the above description, and all modifications that fall within the scope of the claims and their equivalent meaning are intended to be included. The present application is based on Japanese Patent Application (Application No. 2012-248378) filed on Nov. 12, 2012, the entire contents of which are herewith incorporated by reference.

EXPLANATION OF REFERENCE NUMERALS

1 Tire uniformity machine
2 Spindle shaft
3 Rim
4 Load drum
5 Electric motor
6 Spindle housing
7 Drum body
8 Rotation shaft
9 Frame
10 Load cell
11 Calculation unit
12 Rotational phase meter
13 Position mark
T Tire

The invention claimed is:

1. A tire uniformity machine for correcting a uniformity waveform of a tire, at the time when uniformity of the tire is measured while the tire is caused to rotate comprising:
a load drum pressed against the tire to drive to rotate the tire having different in diameter from the load drum;
a rotational phase meter, provided to the load drum, for measuring a rotational phase and frequency of the load drum;
a load cell, provided to the load drum, for measuring a load acting on the load drum; and
a calculation unit having a memory;
the calculation unit configured to:
measure a uniformity waveform of the tire and the rotational phase of the load drum, using the load cell and the rotational phase meter provided to the load drum;
frequency-convert the measured uniformity waveform into a waveform in a frequency domain;
find an amplitude and a phase of a point with a peak amplitude that varies according to the rotational phase of the load drum in a component of an integer multiple of a rotational frequency of the load drum, in a waveform in the converted frequency domain;
store in the memory as a correction parameter the found amplitude and phase in the component of the integer multiple of the rotational frequency of the load drum;
measure the uniformity waveform of the tire and calculating a correction waveform in a range of a rotational phase of the load drum during tire measurement based on the stored correction parameter; and
compute the corrected uniformity waveform of the tire by subtracting the calculated correction waveform from the measured uniformity waveform.

2. The tire uniformity machine according to claim 1, further comprising a rotation shaft for supporting the drum body, wherein the load cell is provided at the upper and lower ends of the rotation shaft.

* * * * *